(12) United States Patent
Jacob

(10) Patent No.: US 6,172,316 B1
(45) Date of Patent: Jan. 9, 2001

(54) ANTENNA SWITCHING DEVICE

(75) Inventor: Hervé Jacob, St Sernin du Bois (FR)

(73) Assignee: U.S. Philips Corporation, New York, NY (US)

( * ) Notice: Under 35 U.S.C. 154(b), the term of this patent shall be extended for 0 days.

(21) Appl. No.: 09/264,044

(22) Filed: Mar. 8, 1999

(30) Foreign Application Priority Data

Mar. 10, 1998 (FR) .................................................. 98 02907

(51) Int. Cl.[7] ............................ H01H 57/00; H01L 41/00
(52) U.S. Cl. ...................... 200/181; 310/311; 310/323.02
(58) Field of Search ................................... 200/181, 245, 200/241, 408, 600; 333/262, 101; 310/309, 311, 328, 330, 332, 346, 358, 359, 363

(56) References Cited

U.S. PATENT DOCUMENTS

| 3,688,135 | * | 8/1972 | Koda et al. ..................... 200/181 X |
| 4,811,246 | * | 3/1989 | Fitzgerald, Jr. et al. ........ 200/181 X |
| 4,916,349 | * | 4/1990 | Kornrumpf ......................... 310/332 |
| 5,578,976 |   | 11/1996 | Yao ..................................... 333/262 |
| 5,883,519 | * | 3/1999 | Kennedy ............................ 324/754 |

FOREIGN PATENT DOCUMENTS

948019 A1 * 10/1999 (EP) .

* cited by examiner

Primary Examiner—J. R. Scott
(74) Attorney, Agent, or Firm—Dicran Halajian

(57) ABSTRACT

The invention relates to an antenna-switching device between the output of a transmitting stage and the input of a receiving stage, which includes a piezoelectric actuator formed by two fixed plates (21, 22) which form a capacitor and a movable contact (23) of a piezoelectric material. The inside surfaces of the plates are locally metallized for forming electrical contacts. Electrodes are provided for applying to the movable contact a control voltage capable of deforming the contact. The deformation occurs between a rest position corresponding to a given part of the plates and a working position corresponding to another given part of the plates.

3 Claims, 4 Drawing Sheets

ANTENNA SWITCHING DEVICE

FIELD OF THE INVENTION

The present invention relates to an antenna-switching device between the output of a transmitting stage and the input of a receiving stage. The invention may particularly be used in mobile telephones.

BACKGROUND OF THE INVENTION

In a system such as a time-division multiple access TDMA cellular radiotelephone, the antenna is alternately to be used at the output of the transmitting circuit or at the input of the receiving circuit. It is thus necessary to isolate these two circuits from each other. Indeed, if the transmitting circuit is not correctly isolated, a significant part of the transmitting power flows into the receiving circuit which is not used at that moment; furthermore, a part of the transmitting power is sent back to its source without even having reached the antenna. Similarly, on the receiving end, a poor isolation relative to the transmitting circuit would lead to losses owing to dissipation or mismatches.

Currently, electrostatic relays such as described, for example, in the document U.S. Pat. No. 5,578,976, are not fast enough and this type of antenna switching device can only be realized for obtaining the desired useful life and rapidity by means of semiconductors such as a PIN diode. But, with such an element, the losses are at least 1 dB because of the series resistance and the current limit imposed thereon (of the order of 1 mA). On the other hand, the compression point of such a switching device is not very high and it thus has a poor linearity.

SUMMARY OF THE INVENTION

It is thus an object of the invention to propose an antenna-switching device remedying the drawbacks described above.

For this purpose, the invention relates to a device that includes a piezoelectric actuator formed by two fixed plates forming a capacitor and by a movable contact of a piezoelectric material. The inside surfaces of the plates are locally metallized so as to form electrical contacts. Further, electrodes are provided so as to supply the movable contact with a control voltage capable of deforming the contact. The deformation occurs between a rest position corresponding to a given part of the plates, and a working position corresponding to another given part of the plates.

The device thus proposed ensures an impedance-controlled high-frequency switching lasting less than 1 ms with very little losses, while the power is kept adapted to the output level of the transmitting circuit, even permitting to support the absence of connection of the antenna for a short while in the case of poor handling by the user. Besides, preserving the characteristic impedance, limits the value of the losses as a result of mismatch and contributes to keeping the power consumption of the device low whose limited weight and mechanical size are also assets.

According to two possible variants of embodiment, the respective lower parts of the inside surfaces form the contacts corresponding to the rest position, and their upper parts form the contacts corresponding to the working position, said movable contact being displaceable in parallel with the inside surfaces of the plates. Alternatively, the plates are formed by a combination of projecting parts, the movable contact being displaceable in transverse direction to the plates between the projecting parts of a plate that correspond to the rest position, and the projecting parts of the other plate that correspond to the working position. According to a third variant of embodiment, the actuator is a piezoelectric motor including. The motor also includes a part that can be deformed by a piezoelectric or a magnetorestrictive effect and a fixed support and, on the other hand, a movable part forming the movable contact. The piezoelectric effect and the mechanical friction between the deformable part and its fixed support and the part forming the movable contact, is provided for provoking alternating deformations of the deformable part along two transversal axes.

BRIEF DESCRIPTION OF THE DRAWINGS

These and other aspects of the invention are apparent from and will be elucidated with reference to the embodiment(s) described hereinafter, which constitute a non-limitative example.

In the drawings.

DESCRIPTION OF PREFERRED EMBODIMENTS

Figure 1:
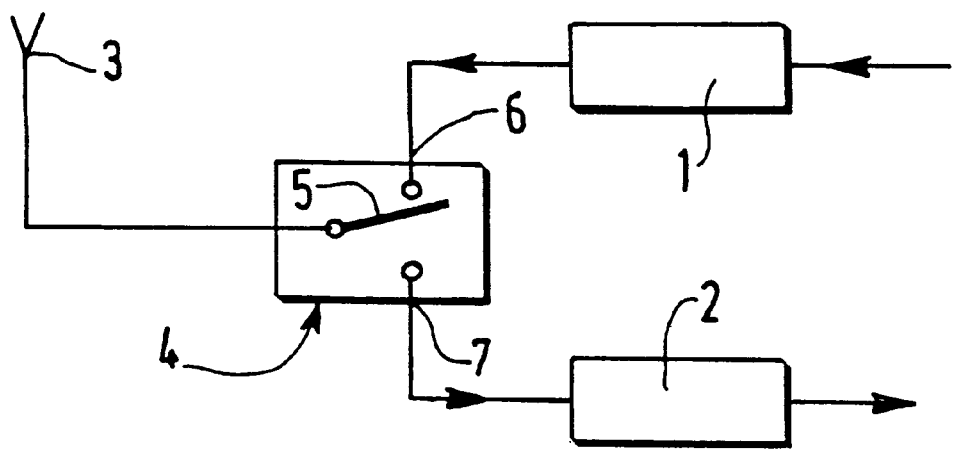
FIG. 1 is a basic circuit diagram showing the arrangement of an antenna-switching device between the transmitting stage and the receiving stage of a mobile telephone.

The transceiver system for mobile telephone represented in FIG. 1 comprises a transmitting stage 1, a receiving stage 2, an antenna 3 and a switch 4 enabling to link the antenna alternately to the output of the transmitting stage or the input of the receiving stage. This switch 4 itself comprises a movable contact 5 connected to the antenna 3, and a first fixed contact 6 connected to the output of the transmitting stage 1 and a second fixed contact 7 connected to the input of the receiving stage 2.

The transmitting stage and the receiving stage 1 and 2 are not described in detail, because they themselves do not have a direct connection to the invention. There will only be described that the transmitting stage includes in series essentially elements such as a modulated audio signal generation circuit, a frequency converter, a bandpass filter, high-frequency amplifier, whereas, the other way around, the receiving stage includes in series essentially elements such as a high-frequency amplifier, a bandpass filter, and a frequency converter.

Figure 2:
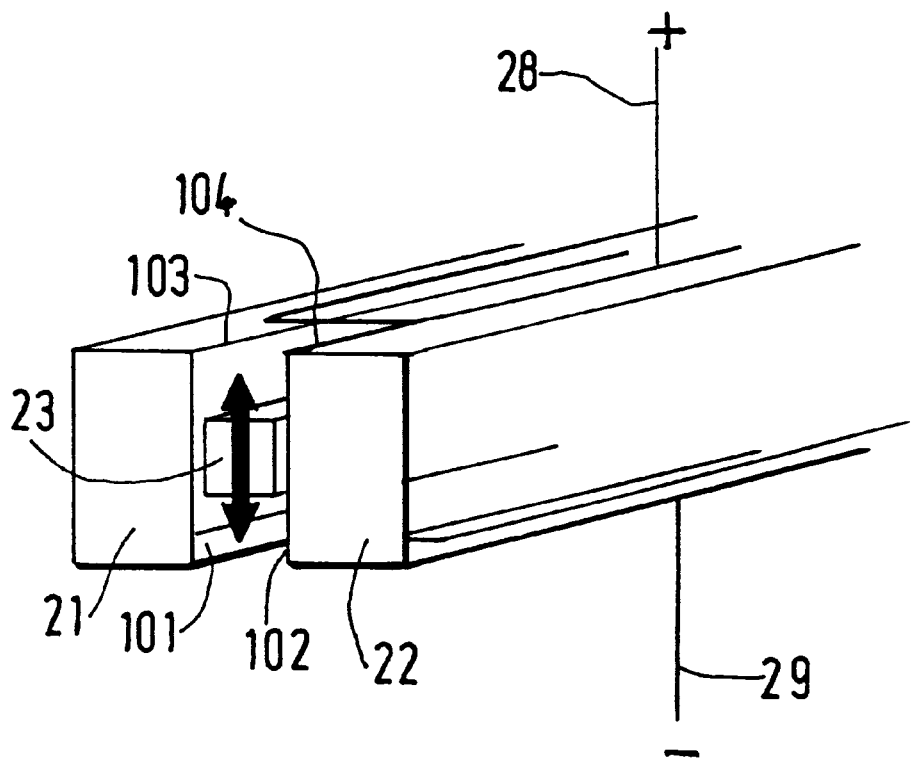
FIGS. 2 and 3 show two embodiments of an antenna switching device according to the invention.

FIG. 2 shows a first illustrative embodiment of the switching device in accordance with the invention. This device is a piezoelectric actuator which comprises two fixed plates 21 and 22 and, between them, a movable contact 23 of piezoelectric material. The inside surfaces of the two fixed plates are locally metallized to form electrical contacts. "Locally" is understood to mean in the embodiment described here that the respective lower parts 101 and 102 of said inside surfaces form contacts corresponding to a position called "rest" position, whereas their upper parts 103 and 104 form contacts corresponding to a "working" position.

The operation of the device is the following. Electrodes 28 and 29 apply to the movable contact 23 a control voltage that deforms the latter and makes it change from its "rest" position to its "working" position; the return to the "rest" position takes place at the end of this control voltage. This double movement of the end of the movable contact 23, represented here in the intermediate position it occupies in the middle of its displacement, is illustrated by the double arrow in FIG. 2. The high-amplitude piezoelectric movement of this movable contact may be obtained by a lever effect, also called "amplified actuator". In this case, the displacement is multiplied by the ratio of the distances to the axis of this lever.

Figure 3:
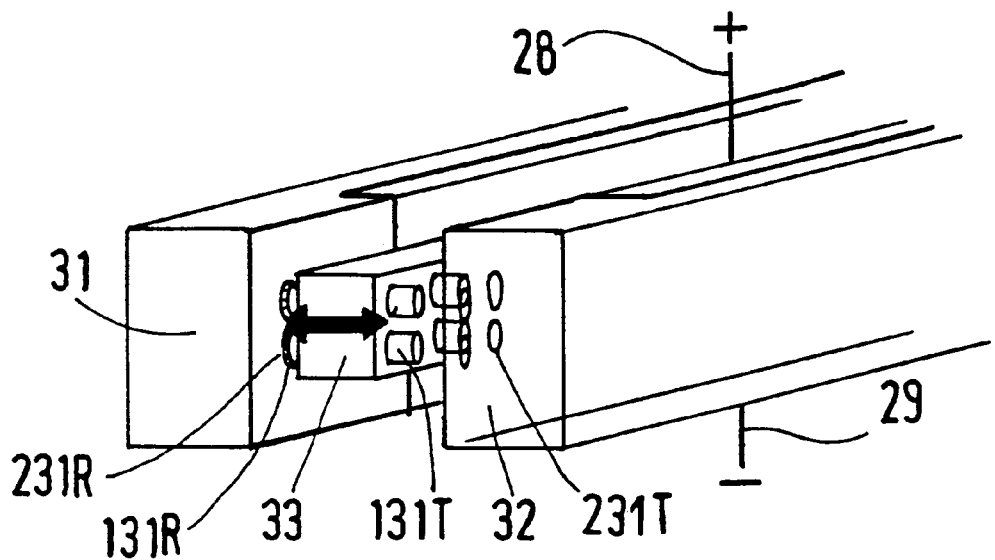

FIG. 3 shows a second illustrative embodiment of the switching device in which the plates of the capacitors (now referenced 31 and 32) forming a contact are constituted by a combination of small cylindrical forms which enable to augment the value of the live capacitor. The operation is the following. The movable contact, now referenced 33, is displaced transversely to the plates following an axis parallel to those of the cylinders (horizontal axis in FIG. 3); this contact 33 comprises on its two surfaces metallized cylinders 131R, 131T which penetrate into corresponding holes 231R, 231T of the fixed plates when the contact 33 is deformed under the influence of the control voltage. When there is no such control voltage, the cylinders 131R form a high-frequency contact capacitor with the holes 231R on the side of the fixed plate 31 to establish the "rest" contact. When there is such a control signal, the cylinders 131T similarly constitute a capacitor with the holes 231T on the side of the fixed plate 32 to establish the "working" contact.

Values of the contact capacitors may be given by way of example for the two examples of embodiment of FIGS. 2 and 3 on the assumption of a 1-mm deformation of the movable contact. In the embodiment of FIG. 2, each contact is realized by means of two plane capacitors, for example, of 1×4 mm, which provides, with a 0.1 mm space for mechanical play of the parts, a capacitance value equal to 0.71 pF. In the embodiment of FIG. 3, each contact is formed by four cylinders having, for example, a length of 1 mm and a diameter of 2 mm, and the capacitance obtained is thus 2.2 pF.

Figure 4:
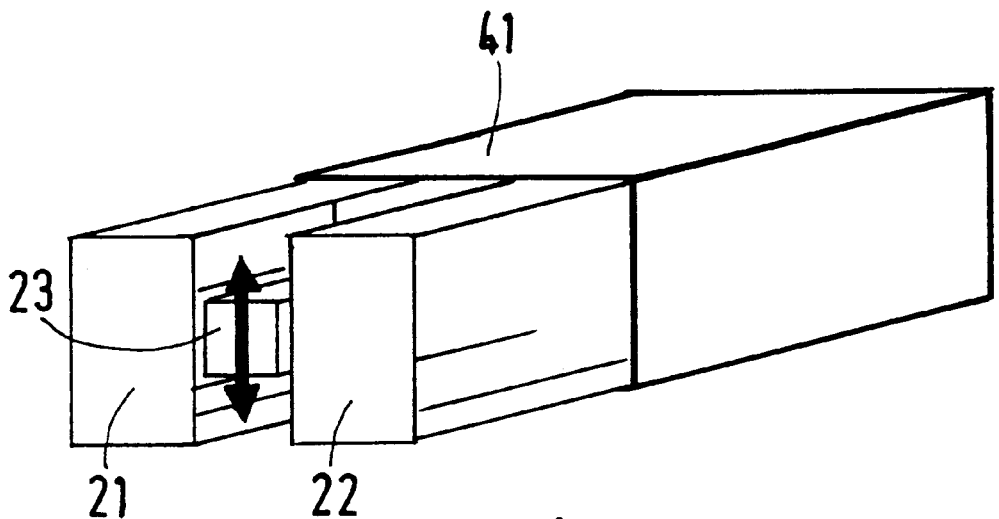
FIG. 4 shows an example of a switching device with a shield.

It will be noted that preserving the characteristic line impedance, necessary for the proper propagation of the high-frequency signals, may be obtained by an appropriate geometry of the device. This impedance is a function of the form and dimensions of the movable contact and of the presence of a shield connected to ground of the device for serving as ground for the whole transmission line. FIG. 4 shows an example of the placing of such a shield 41.

Figure 5:
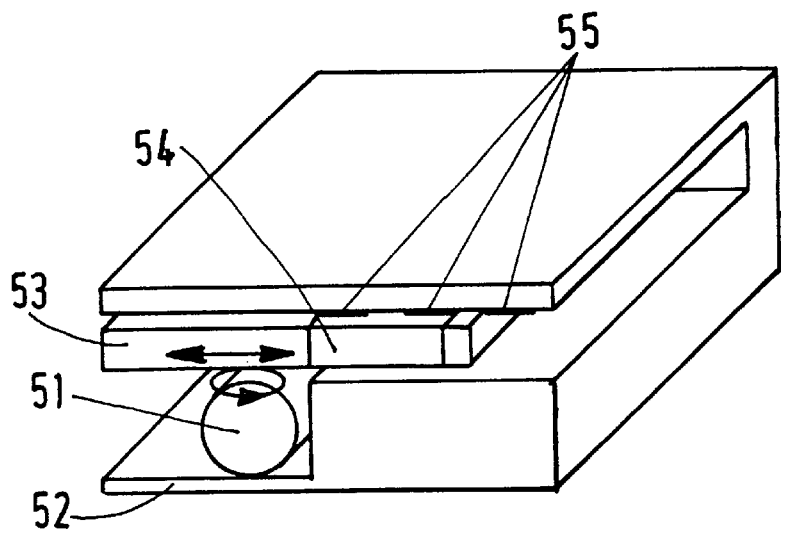
FIG. 5 shows a third embodiment of a device according to the invention.

A third illustrative embodiment, shown in FIG. 5, utilizes the piezoelectric effect, with low-amplitude deformations (10 to 20 μm), and the mechanical friction between a part 51 undergoing deformations as a result of the piezoelectric effect (or by a magnetorestrictive effect) and a fixed plate 52, as well as the mechanical friction between the part 51 and a movable part 53 used as a movable contact in the high-frequency relay considered. The alternate deformations of the piezoelectric part 51 are controlled along two perpendicular axes (or, generally, transversal axes), so that a tangential point of its surface describes an ellipse as represented for the cylindrical part of FIG. 5, and the friction is generally ensured by means of miniature titanium teeth. This mechanical device may be designated by the term of "piezoelectric motor" and other conventional implementations of such a device are known, among which may be mentioned the translating movements created on the basis of undulating deformations of the surface ensuring the friction, or the translating movements of a disc produced by similar deformations radial with respect to the axis of this disc. The other elements are similar, with a metallized part 54 of the movable part 53 realizing the contact via a capacitive effect on the plates 55.

The main advantage of such motors for the use of piezoelectricity applied to the antenna switch resides in the total absence of electric power consumption outside switching phases of the switch; such a mechanical device is self-locking. For the control of the movement, AC control signals are necessary following the two axes, but with very low voltages applied, of the order of several volts, resulting from the low value of the elementary mechanical deformations. The speed of displacement obtained may be high and, therefore, compatible with the rapidity of switching required for antenna switchings of the products operating in the TDMA communication networks. By way of example, a piezoelectric motor driven by 25 μm deformations and actuated with the 30 kHz frequency will have a speed of displacement equal to 0.75 m/s, which produces a displacement of 0.75 mm in 1 ms.

Of course, the present invention is not restricted to the examples of embodiment described and represented above on the basis of which variants may be proposed. For example, the embodiment of FIG. 2 may be simplified in the following fashion. The movable contact possesses metallic surfaces, but no connection to the exterior. The contact of the "rest" position is thus realized by a double capacitive effect between the fixed metallized plate 21 (inside surface 101) and the movable contact, subsequently between this same movable contact and the metallized fixed plate 22 (inside surface 102). Similarly, in the "working" position, the connection takes place via a double capacitive effect between the upper parts of the fixed plates and the movable contact.

Figure 6:
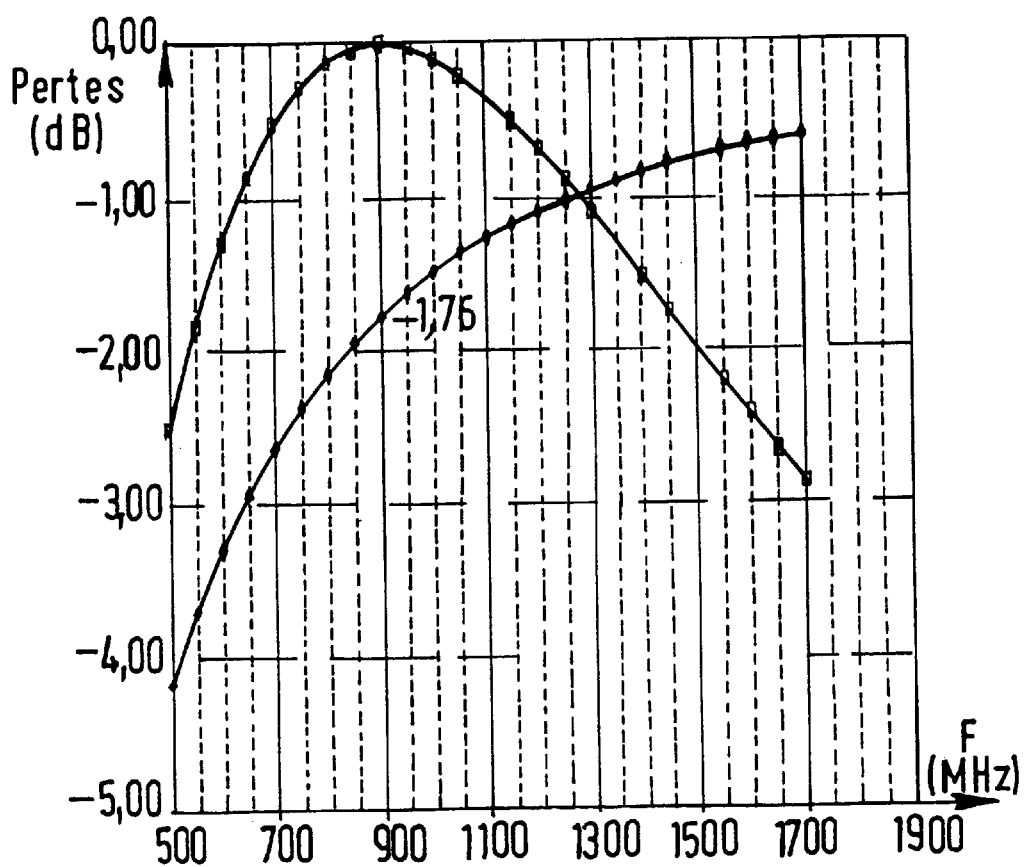
FIG. 6 is a graph showing the increase of losses with frequency, by mismatch, and illustrates the proposed solution.

Besides, it may happen that the switching by capacitive effect is insufficient, despite the frequency. The curve A of FIG. 6 shows, for example, a loss of the order of 1.8 dB at 900 MHz by mismatch due to the presence of a series capacitor. It is thus useful to compensate this mismatch by providing a series inductance that has a value chosen for resonating with said capacitor at the working frequency, and thus canceling the losses at this frequency, as is shown by curve B of FIG. 6.

Figure 7:
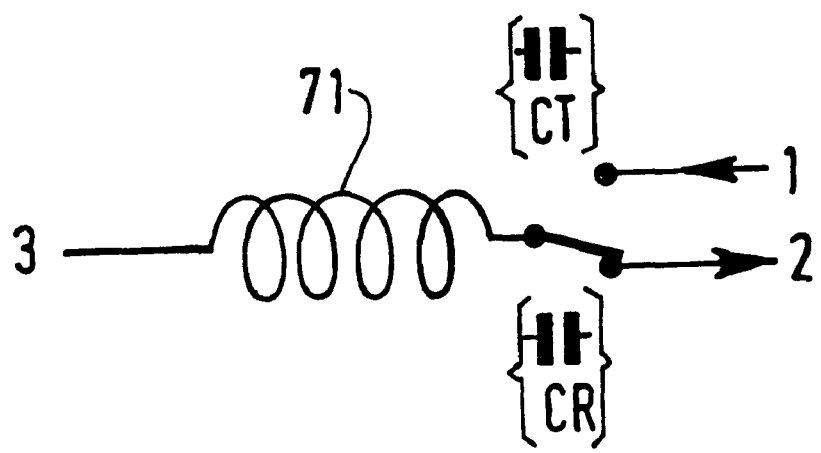
FIGS. 7 and 8 show two possible diagrams of a wiring enabling to remedy said mismatch.
Figure 8:
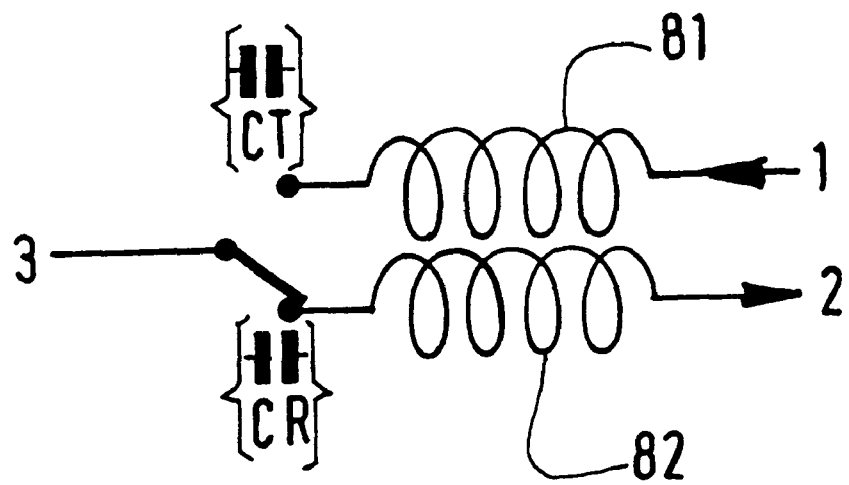

Two wiring diagrams shown in FIGS. 7 and 8 may be proposed for placing this inductance. In FIG. 7 a single inductance 71 is provided on the common output linked to the antenna, for alternatively resonates with each of the two connecting capacitors CT and CR in the working state (transmitting stage) and rest state (receiving stage). The inductance may be a traditional air reactor with a ferrite or ceramic core. Alternatively, then inductance may be formed by a line section, and its installation may be inside or outside said switching device. In FIG. 8, two inductances 81 and 82 are provided. One inductor is in the transmitting stage for resonating with the first capacitor CT. The other inductor is in the receiving stage for resonating with the second capacitor CR. The wiring diagrams shown in FIG. 8 may be suitable for non-standard load impedances, or for compensating for different capacitors depending on the position of the relay. In either case, the match is realized at a given and unique operating frequency. Adaptation circuits combining various components are used if one wishes to realize the same function on a wider frequency band and, particularly, to optimize the same function in two particular frequency bands in the case of a multi-standard transmitter/receiver.

What is claimed is:

1. An antenna-switching device between an output of a transmitting stage and an input of a receiving stage comprising:
 a piezoelectric actuator having by two fixed plates for forming a capacitor; wherein inside surfaces of said plates are locally metallized to form electrical contacts;
 a movable contact of a piezoelectric material located between said plates; and
 electrodes which supply said movable contact with a control voltage for deformation of said movable contact; said deformation occurring between a rest position corresponding to a first part of the plates, and a working position corresponding to a second given part of said plates;
 wherein lower parts of said inside surfaces form the electrical contacts corresponding to the rest position, and upper parts of said inside surfaces form the electrical contacts corresponding to the working position, said movable contact being displaceable in parallel with the inside surfaces of said plates.

2. An antenna-switching device between an output of a transmitting stage and an input of a receiving stage comprising:
 a piezoelectric actuator having by two fixed plates for forming a capacitor; wherein inside surfaces of said plates are locally metallized to form electrical contacts;
 a movable contact of a piezoelectric material located between said plates; and
 electrodes which supply said movable contact with a control voltage for deformation of said movable contact; said deformation occurring between a rest position corresponding to a first part of the plates, and a working position corresponding to a second given part of said plates;
 wherein the plates are formed by a combination of projecting parts, the movable contact being displaceable in transverse direction to said plates between the projecting parts of a first one of said plates that correspond to the rest position and the projecting parts of a second one of said plates that correspond to the working position.

3. An antenna-switching device between an output of a transmitting stage and an input of a receiving stage comprising:
 a piezoelectric actuator having by two fixed plates for forming a capacitor; wherein inside surfaces of said plates are locally metallized to form electrical contacts;
 a movable contact of a piezoelectric material located between said plates; and
 electrodes which supply said movable contact with a control voltage for deformation of said movable contact; said deformation occurring between a rest position corresponding to a first part of the plates, and a working position corresponding to a second given part of said plates;
 said actuator is a piezoelectric motor including a deformable part that can be deformed by a piezoelectric or magnetorestrictive effect;
 a fixed support; and
 a movable part forming said movable contact,
 wherein the piezoelectric effect and a mechanical friction between the deformable part and the fixed support and between the movable part forming the movable contact, is provided for provoking alternating deformations of said deformable part along two transversal axes.

* * * * *